Patented Feb. 11, 1941

2,231,214

UNITED STATES PATENT OFFICE 2,231,214

SOLUBLE OIL

Roy F. Nelson, Port Arthur, Tex., and Theodore W. Langer, Fishkill, N. Y., assignors to The Texas Company, New York, N. Y., a corporation of Delaware No Drawing. Application May 6, 1938,
Serial No. 206,370

7 Claims. (Cl. 252—33)

This invention relates to soluble oils comprising petroleum oils which disperse readily when added to water. Oils of this type are used, for example, in the preparation of aqueous emulsions for use as a cooling and lubricating fluid in the cutting and turning of metals, and as a slushing oil for the protection of metal surfaces against oxidation.

In producing soluble oils from petroleum oils it is common practice to emulsify the oil with a limited amount of water, so that upon addition of larger amounts of water the oil may be dispersed readily in the water. Various emulsifying agents have been used for the purpose of decreasing surface tension and assisting the dispersion of the oil in the water. Likewise many emulsion stabilizing agents have been used for preventing the separation of oil from the emulsion after the oil has been emulsified.

It is an object of this invention to produce a soluble oil which is superior to soluble oils which have been used in the past.

This invention relates to a soluble oil in which the emulsifying agent comprises substantially equal parts of a soap prepared by reacting hard rosin with an alkali such as sodium hydroxide, and a soap prepared by reacting naphthenic acids with an alkali such as sodium hydroxide.

Applicants have found that sodium resinate, when used in the manufacture of soluble oil, is very satisfactory from the standpoint of facilitating emulsification of the oil with water. But sodium resinate alone, when mixed with the oil and allowed to stand for a time, settles out. It is therefore necessary to stir a mixture of oil and sodium resinate so as to again disperse the sodium resinate in the oil, before diluting the mixture of oil and soap with water. Because of this difficulty of keeping the sodium resinate dispersed in the oil, it is not desirable to use sodium resinate alone as the emulsifying agent.

Sodium naphthenate is more soluble in oil than sodium resinate. But a mixture of oil and sodium naphthenate alone does not emulsify as readily when water is added as a mixture of oil and sodium resinate does. When sodium naphthenate alone is used as the emulsifying agent the particles of oil and soap tend to agglomerate to form large lumps instead of being intimately dispersed in the water to form an emulsion of small particle size.

Applicants have found that by using about equal parts of sodium resinate and sodium naphthenate as the emulsifying agent, the mixture of oil and soap is readily dispersed in water to form an emulsion of small particle size. Moreover the mixture of sodium resinate and sodium naphthenate remains dispersed in the oil and does not settle out upon standing.

Applicants' invention further relates to a soluble oil of the type described which contains a small amount of unsaponified rosin and naphthenic acids. The presence of the free acid material assists in keeping the soap mixture dispersed in the oil.

In preparing the soluble oil of this invention a small amount of water is preferably used to make the soluble oil fluid and to prevent oil separation, or stratification of the emulsion, upon mixing the soluble oil with larger amounts of water.

The product of this invention preferably contains a small amount of a mutual solvent which is effective in preventing the separation of soap. The use of such a solvent assists in producing a soluble oil of good texture. Diethylene glycol monobutyl ether, known in the trade as butyl carbitol, is a suitable solvent.

Applicants' invention also contemplates the use, in a product of this type, of a small amount of a sulfonated material such as sulfonated castor oil. Sulfonated castor oil increases the efficiency of the soluble oil when used as a cutting oil, from the standpoint of improving tool life and improving the finish of machined surfaces. The addition of sulfonated castor oil also makes the soluble oil resistant to the action of hard water. The use of hard water in soluble oil emulsions is ordinarily attended by the precipitation of calcium soaps. Sulfonates also have a tendency to prevent the rusting of metals, in the presence of moisture. Different sulfonates are effective for this purpose in greater or less degree, with reference to certain particular classes of metals. The addition of sulfonates therefore makes the soluble oil valuable for use as a slushing oil, for preventing the rusting of metals. Sulfonated castor oil has been found particularly effective for preventing the rusting of mild steel. It also prevents, to some extent at least, the oxidation of other metals.

A soluble oil prepared in accordance with this invention may contain the following ingredients, for example, by weight:

| | Per cent |
|---|---|
| Sodium resinate | 9 |
| Sodium naphthenate | 9 |
| Unsaponified rosin and naphthenic acids | 2 |
| Sulfonated castor oil | 3 |
| Solvent (butyl carbitol) | 1 |
| Water | 4 |
| Petroleum oil (lubricating oil, viscosity 70 seconds at 100° F., Saybolt Universal) | Balance |
| | 100 |

The sodium resinate is prepared by reacting hard rosin (also described as gum rosin and wood rosin) with sodium hydroxide.

The sodium naphthenate is prepared from naphthenic acids derived from petroleum oils of the naphthene base type. A particularly high grade of naphthenic acids, characterized by a high saponification value and a low non-saponifiable matter content, has been recovered from naphthene base gas oils. In preparing the soluble oil of this invention it is preferable to use such naphthenic acids. High non-saponifiable matter content tends to produce very dark soluble oils and off-color emulsions. Naphthenic acids of high saponification value and of very low non-saponifiable matter content tend to produce extremely easy emulsification, whiter emulsions, more effective rust prevention, and better settling of grinding dirt from the emulsion.

The following procedure may be employed for preparing a soluble oil in accordance with this invention:

The rosin is dissolved in an equal amount by weight of the petroleum oil. The rosin and the naphthenic acids are saponified by mixing the above described rosin solution, and the naphthenic acids, with the sodium hydroxide solution and stirring the resulting mixture about two hours. The amount of sodium hydroxide used is regulated so that a small amount of the rosin and naphthenic acids remains unsaponified. The butyl carbitol and the sulfonated castor oil are then added to the mixture. At this point enough of the petroleum oil is added to the mixture to make the volume thereof about equal to one-half the calculated volume of the finished product. The mixture is stirred until it becomes homogeneous and then the remainder of the petroleum oil is added to produce a finished soluble oil.

Obviously many modifications and variations of the invention may be made without departing from the spirit and scope thereof, and therefore only such limitations should be imposed as are indicated by the appended claims.

We claim:

1. A soluble oil comprising a petroleum oil, about 9% of a rosin soap, about 9% of a naphthenate soap, about 2% of unsaponified rosin and naphthenic acids, about 3% of sulfonated castor oil, about 1% of diethylene glycol monobutyl ether, and about 4% water.

2. A soluble oil in the form of a stable homogeneous liquid emulsion comprising mineral lubricating oil, water, a mixture of about equal proportions of rosin soap and naphthenate soap with a small proportion of free naphthenic acids, and an unsaponified sulfonated fatty material.

3. A soluble oil in the form of a stable homogeneous liquid emulsion comprising mineral lubricating oil, water, about equal proportions of a mixture of rosin soap and naphthenate soap, about 2% by weight of unsaponified soap acids comprising naphthenic acids, and about 3% by weight of an unsaponified sulfonated fatty material.

4. A soluble oil in the form of a stable homogeneous liquid emulsion comprising by weight about 4% water, about 18% of a mixture of about equal proportions of rosin soap and naphthenate soap, about 2% of unsaponified soap acids comprising naphthenic acids, about 1% of a mutual solvent, about 3% of unsaponified sulfonated castor oil, and the balance a light mineral lubricating oil.

5. A liquid soluble oil adapted to be dispersed in water for use as a cooling and lubricating fluid in the cutting and turning of metals and as a slushing oil in the protection of metal surfaces against oxidation, comprising a mineral lubricating oil, a mixture of about equal proportions of rosin soap and naphthenate soap with a small proportion of unsaponified naphthenic acids, and a small proportion of unsaponified sulfonated castor oil.

6. A liquid soluble oil adapted to be dispersed in water for use as a cooling and lubricating fluid in the cutting and turning of metals and as a slushing oil in the protection of metal surfaces against oxidation, comprising a light mineral lubricating oil, a mixture of about equal proportions of rosin soap and naphthenate soap with a small proportion of unsaponified soap acids comprising naphthenic acids, a small proportion of a mutual solvent, and a small proportion of unsaponified sulfonated castor oil.

7. A soluble oil in the form of a stable homogeneous liquid emulsion comprising mineral lubricating oil, water, a mixture of about equal proportions of rosin soap and naphthenate soap, a small amount of unsaponified high molecular weight carboxylic acid, and a small amount of an unsaponified sulfonated fatty material.

ROY F. NELSON.
THEODORE W. LANGER.